(12) United States Patent
Asada

(10) Patent No.: US 9,503,701 B2
(45) Date of Patent: Nov. 22, 2016

(54) SCANNING PROJECTORS THAT USE GUARD BANDS TO REDUCE COLOR SHIFTS, AND METHODS AND CONTROLLERS FOR USE THEREWITH

(71) Applicant: Intersil Americas LLC, Milpitas, CA (US)

(72) Inventor: Akihiro Asada, Chigasaki (JP)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 14/798,259

(22) Filed: Jul. 13, 2015

(65) Prior Publication Data
US 2016/0301905 A1 Oct. 13, 2016

Related U.S. Application Data

(60) Provisional application No. 62/146,747, filed on Apr. 13, 2015.

(51) Int. Cl.
H04N 9/12 (2006.01)
H04N 9/31 (2006.01)

(52) U.S. Cl.
CPC .................. H04N 9/3182 (2013.01)

(58) Field of Classification Search
CPC ........ H04N 3/237; H04N 3/233; H04N 3/23; H04N 3/26; H04N 9/3102; H04N 9/3105; H04N 9/3197; H04N 9/3111; H04N 9/3114; H04N 9/3117; H04N 9/31; H04N 9/3147; H04N 9/317; H04N 9/3185; H04N 9/3188; H04N 9/3182; H04N 2005/7433; H04N 5/7458; H04N 5/7466; G03B 21/14; G03B 21/00; G03B 21/008; G03B 21/147; G02B 27/1026; G02B 27/1046; G09G 2310/0235

USPC ............... 348/742, 743, 745–747, 750–755, 348/790–793, 801, 802; 353/30, 31, 69; 356/121
IPC ....................... H04N 9/12,9/31, 5/74
See application file for complete search history.

(56) References Cited

U.S. PATENT DOCUMENTS

| | | | |
|---|---|---|---|
| 5,144,631 A | 9/1992 | Okino | |
| 5,426,452 A | 6/1995 | Davis et al. | |
| 7,255,445 B2 | 8/2007 | Kojima | |
| 8,243,211 B2 | 8/2012 | Bazzani et al. | |
| 8,425,048 B1 | 4/2013 | Chamberlin et al. | |
| 8,444,275 B2 | 5/2013 | Kurtz et al. | |
| 8,750,341 B2 | 6/2014 | Bazzani et al. | |
| 2007/0064161 A1* | 3/2007 | Takeda | H04N 9/3114 348/743 |
| 2009/0256973 A1 | 10/2009 | Bazzani et al. | |
| 2011/0176069 A1 | 7/2011 | Chamberlin et al. | |
| 2012/0140784 A1 | 6/2012 | Quirk et al. | |
| 2014/0327835 A1 | 11/2014 | Wolfman et al. | |

* cited by examiner

Primary Examiner — Sherrie Hsia
(74) Attorney, Agent, or Firm — Vierra Magen Marcus LLP

(57) ABSTRACT

A scanning projector system includes a controller, a driver and one or more micro-mirror(s). The controller produces first, second and third pixel data in dependence on a video signal. The driver drives first, second and third light emitting elements in dependence on the first, second and third pixel data produced by the controller, to thereby emit light of first, second and third colors. The micro-mirror(s) project an image in dependence on light beams produced in dependence on the light of the first, second and third colors. To reduce color shifts due to inter-pixel interference, the controller and/or driver causes at least one timing guard band per pixel period associated with each instance of the pixel data.

23 Claims, 14 Drawing Sheets

SCANNING PROJECTORS THAT USE GUARD BANDS TO REDUCE COLOR SHIFTS, AND METHODS AND CONTROLLERS FOR USE THEREWITH

PRIORITY CLAIM

This application claims priority to U.S. Provisional Patent Application No. 62/146,747, filed Apr. 13, 2015, which is incorporated herein by reference.

RELATED APPLICATIONS

This application is related to commonly invented and commonly assigned U.S. patent application Ser. No. 14/798,288 entitled SCANNING PROJECTORS THAT USE MULTIPLE PULSES PER PIXEL PERIOD TO REDUCE COLOR SHIFTS, AND METHODS AND CONTROLLERS FOR USE THEREWITH, which was filed on the same day as the present application, and which is incorporated herein by reference.

DETAILED DESCRIPTION

The benefits, features, and advantages of the various embodiments of the present invention will become better understood with regard to the following description, and accompanying drawings. The following description is presented to enable one of ordinary skill in the art to make and use the present invention as provided within the context of a particular application and its requirements. Various modifications to the embodiments described herein will, however, be apparent to one skilled in the art, and the general principles defined herein may be applied to other embodiments. Therefore, the embodiments of the present invention is not intended to be limited to the particular embodiments shown and described herein, but are to be accorded the widest scope consistent with the principles and novel features herein disclosed.

Figure 1:
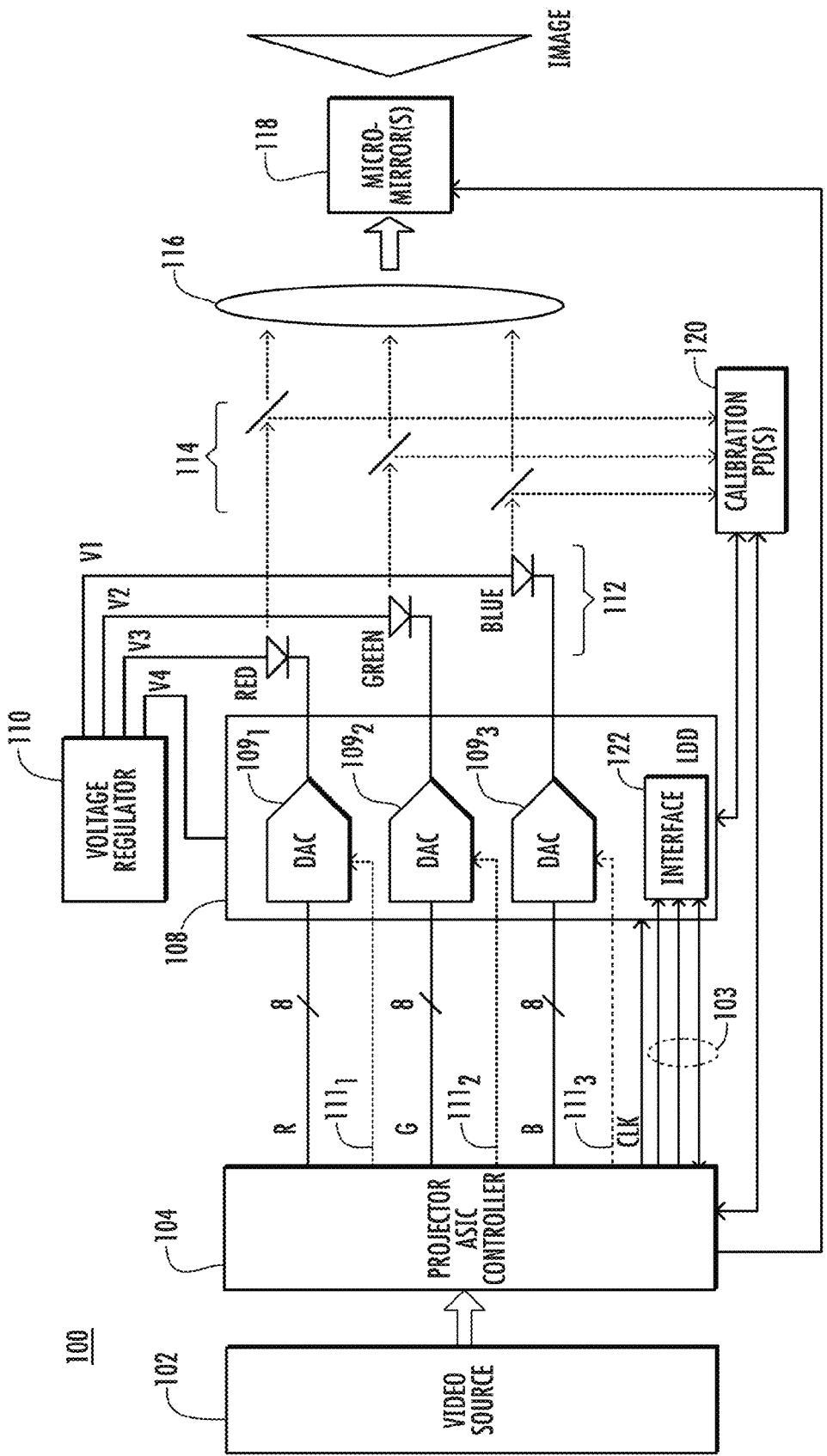
FIG. 1 illustrates a scanning projector system according to an embodiment of the present invention.

FIG. 1 illustrates a scanning projector system 100, according to an embodiment. The scanning projector system 100 can be integrated with or attached to a portable device, such as, but not limited to, a mobile phone, a smart phone, a portable computer (e.g., a laptop or netbook), a personal data assistant (PDA), or a portable media player (e.g., DVD player). The scanning projector system 100 can alternatively be integrated with or attached to a non-portable device, such as a desktop computer or a media player (e.g., a DVD player), but not limited thereto. The scanning projector system 100 can alternatively be a stand-alone device, in which case it may be referred to as a pico-projector. The scanning projector system 100 can also be used to provide a heads up display (HUD), e.g., in a vehicle.

Referring to FIG. 1, the scanning projector system 100 is shown as including a video source 102, a controller 104 (e.g., an application specific integrated circuit and/or a micro-controller), a laser diode driver (LDD) 108 and a voltage regulator 110. Depending on the type of video source, a video analog-font-end (AFE) can be included between the video source and controller, and the video AFE may include, e.g., one or more analog-to-digital converters (ADCs). For example, if the input is a Video Graphics Array (VGA) input, then a video AFE may be included. However, a video AFE may not be needed where the video source is a digital video source, as is typically the case.

The controller 104 can perform gamma correction, scaling and/or pre-distortion of video signals before such signals are provided to the LDD 108. The voltage regulator 110 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the scanning projector system 100.

The LDD 108 is shown as including three digital-to-analog converts DACs 1091, 1092 and 1093, which can be collectively referred to as DACs 109, and can individually be referred to as a DAC 109. The LDD 108 is also shown as including a serial interface 122 which may receive, via a serial bus 103, a serial enable (SEN) signal and a serial clock signal (SClk) from a serial interface of the controller 104. Additionally, a bi-directional serial data input/output (SDIO) line of the serial bus 103 allows the controller 104 to write data to and read data from registers within the LDD 108. Alternative serial buses and interfaces can be used, such as, but not limited to, an Inter-Integrated Circuit (I2C) or a Serial Peripheral Interface (SPI) bus and interface. The LDD 108 can also include registers, timers, and the like, which are not shown.

The DACs 109 of the LDD 108 drive light emitting elements 112, which can include, e.g., a red laser diode, a green laser diode and a blue laser diode, but are not limited thereto. Where the LDD 108 is used to drive red (R), green (G) and blue (B) laser diodes, the LDD can be referred to as a RGB triple laser diode driver. Where the LDD 108 is used to drive a red (R) laser diode, two green (G) laser diodes and a blue (B) laser diode, the LDD can be referred to as a RGGB quadruple laser diode driver. The signal output be each of the DACs 109 can be referred to as a laser drive signal, or as a laser modulation current, or more simply as a drive signal or a drive current.

The light produced by the light emitting elements 112 can be provided to beam splitters 114, which can direct a small percentage of the light toward one or more calibration photo-detectors (PDs) 120, and direct the remainder of the light toward projector optics 116, which include lenses, mirrors, reflection plates and/or the like. The light beams output by the optics 116 can be provided to one or more micro mirror(s) 118. Where the light emitting elements 112 are laser diodes, the light beams produced can also be referred to as laser beams. The mirror(s) 118 can be controlled by the controller 104, or another portion of the system, to raster-scan reflected light onto a surface, e.g., a screen, a wall, the back of a chair, etc. Because of the scanning of laser beams performed using the mirror(s) 118, the scanning projector system 100 can be referred to as a laser based scanning projector 100. In one configuration, a single mirror 118 that can be controlled in both the X and Y directions is used for scanning of the laser beams. In another configuration, a first mirror 118 is used for controlling horizontal scanning (i.e., scanning in the X direction), and a second mirror 118 is used for controlling vertical scanning (i.e., scanning in the Y direction). These are just two exemplary configurations, which are not meant to be limiting. It is also possible that more than two mirrors 118 be used.

In a laser based scanning projector, at each clock cycle, the R, G, and B lasers diodes output a pixel intensity at a location set by the linear speed of the scanning mirror(s) 118 and a clock time base. At each clock cycle, each color data pixel intensity can be either controlled using a pulse width modulation (PWM) scheme, where the R, G and B lasers diodes are turned on for different durations, or by amplitude modulation (AM), where the R, G and B laser diodes may all be driven at the same time but with different current levels. In other words, the intensity of the light emitted by each of the R, G and B laser diodes can be controlled by controlling the amplitudes of the laser drive signals output by the DACs 109, or by controlling the durations of pulses of the laser drive signals output by the DACs 109.

The R, G and B data provided by the controller 104 to the LDD 108 can be referred to as color pixel data, or more generally, as color data. More specifically, R color pixel data is provided to the DAC 1091, G color pixel data is provided to the DAC 1092, and B color pixel data is provided to the DAC 1093. Each clock cycle of the color pixel data can be referred to as a color pixel period, or simply as a pixel period. Controlling the amplitudes of the laser drive signals can also be referred to as "level control". Controlling the durations of pulses of the laser drive signals can also be referred to as "PWM control" or as "duty-cycle control". It is also possible to use a combination of duty-cycle control and level control. In other words, both the durations of pulses output by the DACs 109, and the amplitudes of such pulses, can be controlled. There are multiple different ways in which this can be accomplished, some of which are described below.

In one embodiment, the controller 104 can perform level control by controlling the values of each of the R, G and B color pixel data, and the controller 104 can perform duty-cycle control by controlling how long the values of each of the R, G and B color pixel data are output during each pixel period. In another embodiment, the controller 104 can perform level control by controlling the values of each of the R, G and B color pixel data, and the controller 104 can perform duty-cycle control by selectively enabling each of the DACs 1091, 1092 and 1093 using enable signals shown as dashed lines 1111, 1112 and 1113 in FIG. 1. In other words, to perform duty cycle control, each of the DACs of the LDD 108 can be selectively enabled for certain portions of pixel periods, and disabled for other portions of pixel periods.

Figure 2:
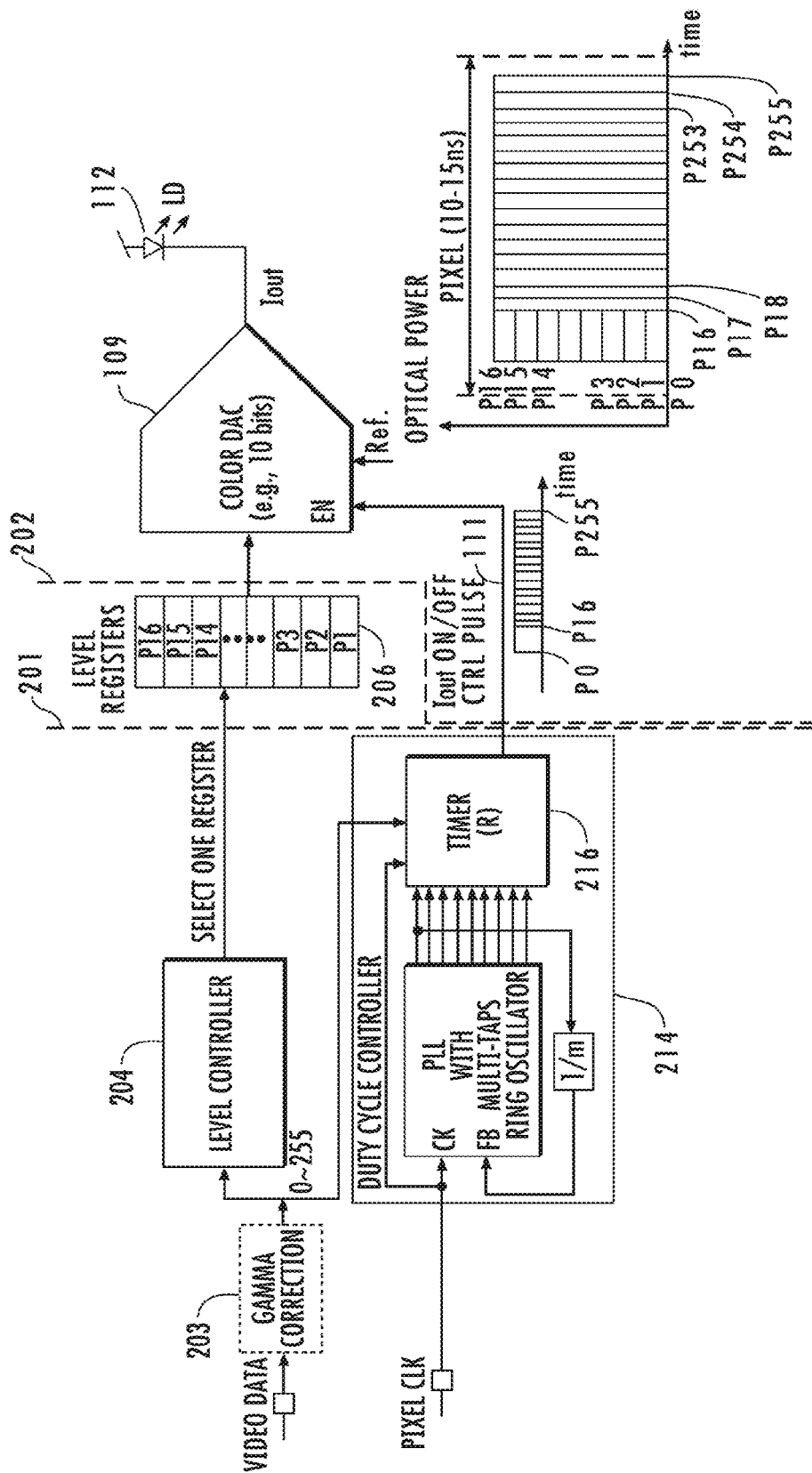
FIG. 2 illustrates exemplary details of a channel of the scanning projector system introduced in FIG. 1.

In each of the above embodiments, the controller 104 can receive video data from the video source 102. As noted above, the controller 104 can perform gamma correction, scaling and/or pre-distortion of such video data. The video data received from the video source 102 can include R video data, G video data, and B video data, each of which can include, for example, eight bits of data representing intensity or grayscale levels between 0 and 255, but is not limited thereto. Each of the R, G and B light emitting elements 112 (e.g., R, G and B laser diodes) is controlled using a separate channel, i.e., an R channel, a G channel and a B channel. Each channel can include circuitry within the controller 104 and further circuitry within the LDD 108. For example, the R channel can include circuitry within the controller 104 that drives the DAC 1091 and circuitry within the LDD 108 (e.g., the DAC 1091 in the LDD 108 can also be part of the R channel). FIG. 2 illustrates exemplary details of one such channel.

Referring to FIG. 2, in accordance with an embodiment, everything to the left of the vertical dashed line labeled 201 is within the controller 104, and everything to the right of the vertical dashed line labeled 201 is within the LDD 108. In accordance with another embodiment, everything to the left of the vertical dashed line labeled 202 is within the controller 104, and everything to the right of the vertical dashed line labeled 202 is within the LDD 108. Other variations are possible, and within the scope of an embodiment. FIG. 2 illustrates video data being provided to an optional gamma corrector 203, which outputs gamma corrected video data. Assuming, for example, that the channel shown in FIG. 2 is the R channel, then the video data can more specifically be referred to as R video data, and the gamma corrected video data can more specifically be referred to as R gamma corrected video data. More generally, the gamma corrected video data can simply be referred to as video data. In other words, whether or not video data has been gamma corrected, such data can simply be referred to herein as video data.

In FIG. 2, the video data is shown as being provided to both a level controller 204 and a duty cycle controller 214. The level controller 204 can be implemented using a look-up-table (LUT), but is not limited thereto. Such a look-up table can be used to select one of a plurality of level values stored in a block of registers 206, wherein the selected level value is provided to the input of the DAC 109. Similarly, at least a portion of a timer 216 within the duty-cycle controller 214 can be implemented using a look-up-table. The duty-cycle controller 214 can also include a phase lock loop (PLL), as shown in FIG. 2. Other variations are possible, and within the scope of an embodiment.

The DAC 109 includes an input that receives a level value, selected by the level controller 109, and an output that selectively drives the light emitting element 112. The DAC 109 also includes an enable (EN) terminal that receives an output of the duty cycle controller 214. The DAC 109 can be enabled when a signal input to the EN terminal is high, and the DAC 109 can be disabled when the signal input to the EN terminal is low, or vice versa, depending upon implementation.

Still referring to FIG. 2, the level controller 204 selects which one of a plurality of possible current levels will be produced by the DAC 109 to drive the light emitting element 112, wherein the selection is based on the video data signal provided to the level controller 204. The duty cycle controller 214 similarly selects one of a plurality of possible duty cycles that the DAC 109 will use to drive the light emitting element 112, wherein the selection is based on the video data signal provided to the duty cycle controller 214. Assume, for example, that the video data signal is an 8-bit signal, having 256 different possible values. All of the 8-bits can be used to select a level, and all of the 8-bits can be used to select a duty cycle, for the drive signal used to drive the light emitting element 112. Alternatively, certain bits of the 8-bit video data signal can be used to select the level, and other bits of the 8-bit video data signal can be used to select the duty cycle. For example, the 4 least significant bits (LSBs) can be used to control the level, and the 4 most significant bits (MSBs) can be used to control the duty cycle. This is just one example, which is not meant to be limiting.

Figure 3:
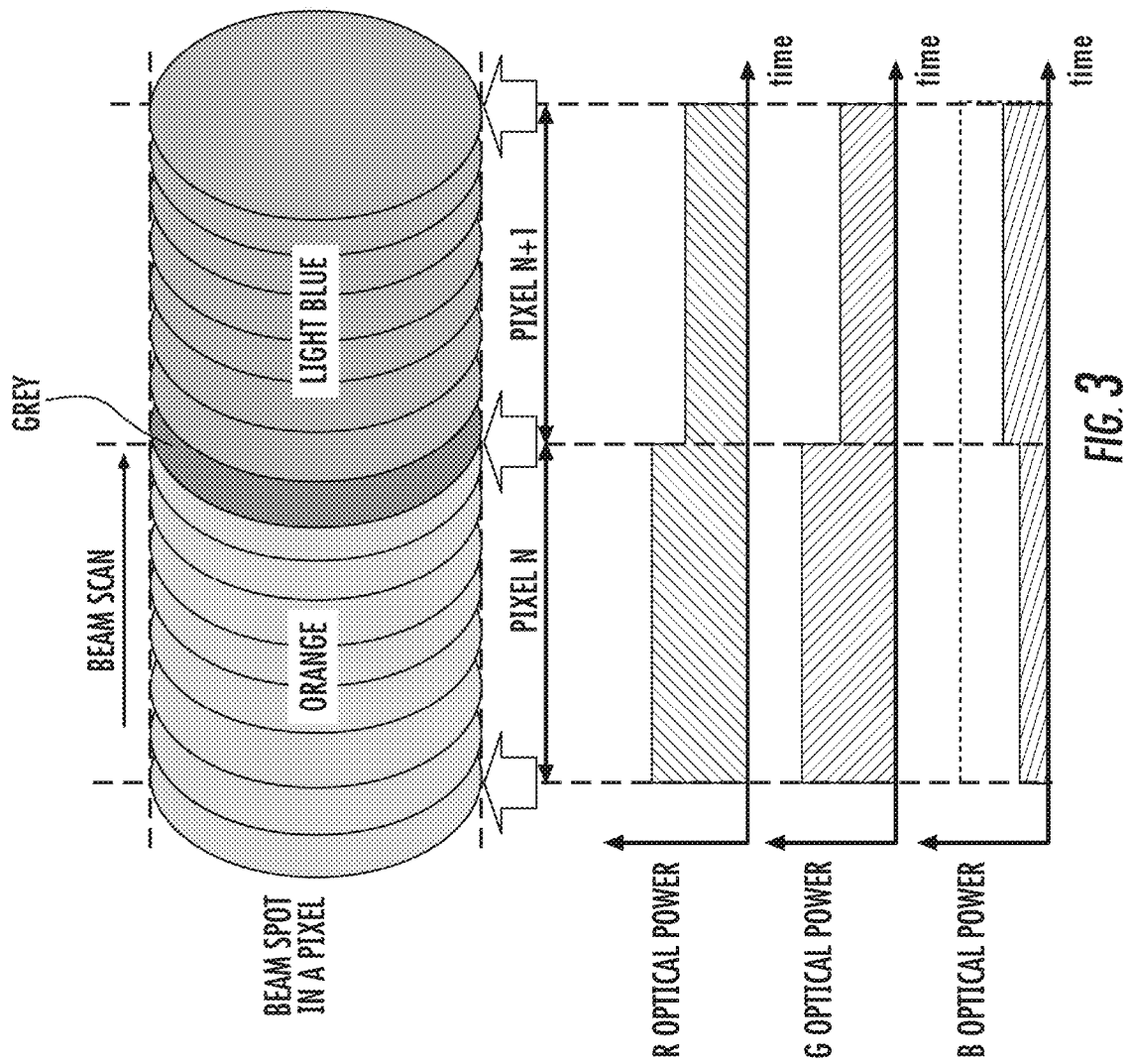
FIG. 3 illustrates that a color shift may occur due to inter-pixel interference at the beginning and/or end of each pixel period.

Whether using level control, duty-cycle control, or a combination of both level control and duty-cycle control, there is the potential problem that color shifting may occur. FIG. 3, for example, illustrates that a color shift may occur due to inter-pixel interference at the beginning and/or end of each pixel period. Referring to FIG. 3, towards the bottom of the figure are three graphs of optical power versus time, for red (R), green (G) and blue (B) light emitted by the R, G and B light emitting elements 112, for each of two pixel periods, labeled Pixel N and Pixel N+1. Towards to the top of FIG. 3 are ovals illustrative of beam spots in a pixel during a beam scan. During the Pixel N period, the R, G and B light levels are intended to be combined to produce an orange colored pixel, represented by beams spots labeled "orange". During the Pixel N+1 period, the R, G and B light levels are intended to be combined to produce a light blue colored pixel, represented by beams spots labeled "light blue". However, in the example shown in FIG. 3, at the end of the Pixel N period, and the beginning of the adjacent Pixel N+1 period, a non-intended beam spot labeled "gray" is shown as resulting from inter-pixel interference. In other words, if beams spots associated with adjacent pixel periods overlap one another, an undesirable color shift may occur due to such an overlap, which can also be referred to as inter-pixel interference. Certain embodiments of the present invention, which avoid the above described inter-pixel interference, will now be described with reference to FIG. 4.

Figure 4:
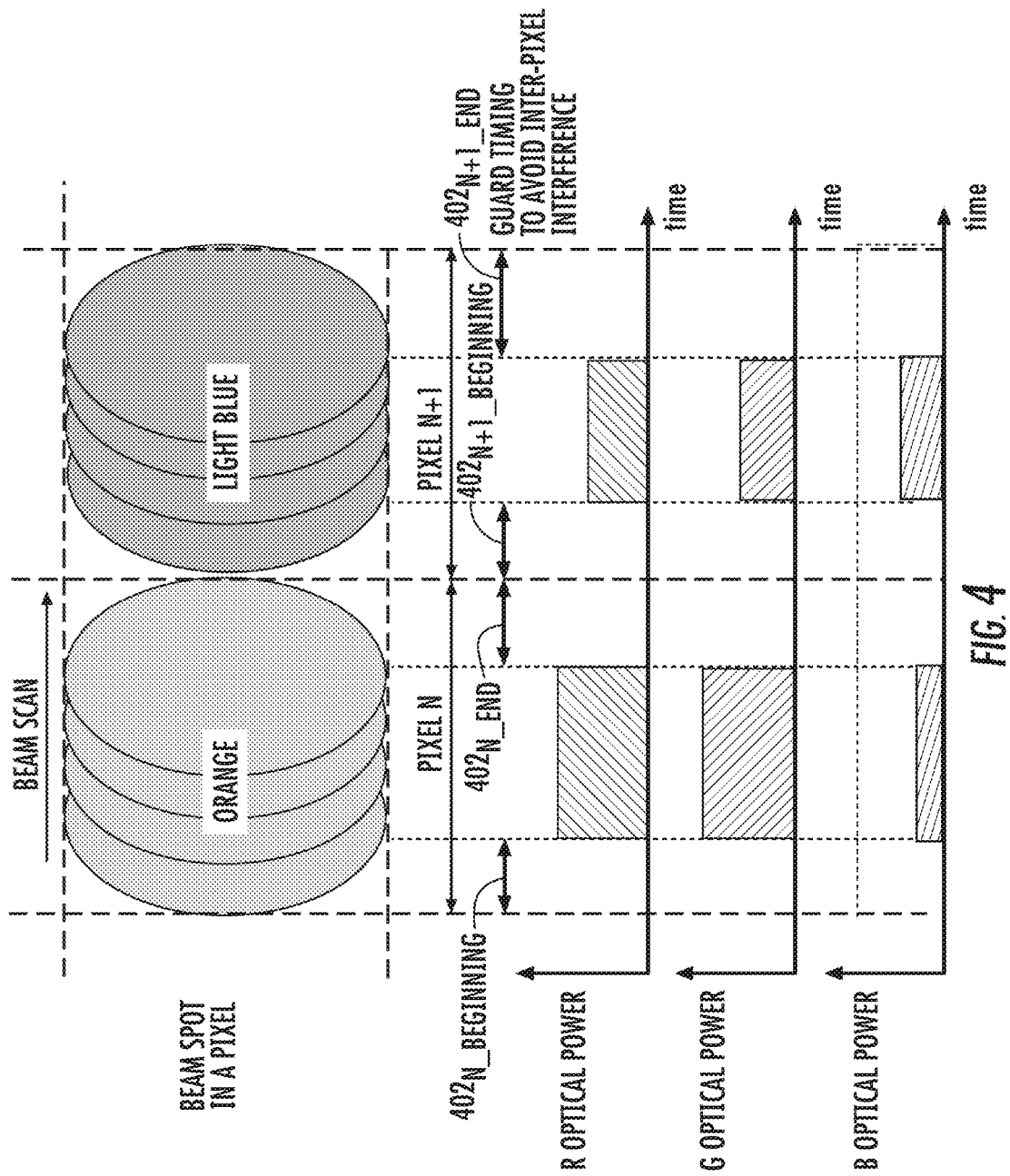
FIG. 4 illustrates how guard bands can be used to avoid inter-pixel interference, in accordance with specific embodiments of the present invention where level control is used to control the intensity of light emitted by red (R), green (G) and blue (B) light emitting elements.

Referring to FIG. 4, in accordance with certain embodiments, guard timing bands, which can also be referred to as timing guard bands, or simply as guard bands, are used to avoid inter-pixel interference. In accordance with an embodiment, each pixel period includes a guard timing band at both the beginning and end of the pixel period. For example, referring to FIG. 4, the Pixel N period is shown as including a beginning guard band $402_{N\_beginning}$ and an end guard band $402_{N\_end}$. Similarly, the Pixel N+1 period is shown as including a beginning guard band $402_{N+1\_beginning}$ and an end guard band $402_{N+1\_end}$. The guard bands can collectively be referred to as guard bands 402, or individually as a guard band 402. The width of each guard band 402 can be predetermined and fixed. Alternatively, the width of each guard band 402 can be dynamic and adjustable. In an alternative embodiment, only the end of each pixel period includes a guard timing band, but the beginning of each pixel period does not. In still another embodiment, only the beginning of each pixel period includes a guard timing band, but the end of each pixel period does not. In an embodiment, the guard band(s) within each pixel period preferably take up less than 20% of the width (i.e., time) of each pixel period, and even more preferably, take up less than 10% of the width (i.e., time) of each pixel period.

In accordance with certain embodiments described herein, the controller 104 and/or the LDD 108 is/are configured to cause at least one timing guard band, per pixel period associated with each instance of pixel data, in order to avoid inter-pixel interference. There are various ways that the controller 104 and/or the LDD 108 can accomplish this. For example, the controller 104 can control the period of time, during each pixel period, that it provides R pixel data, G pixel data and B pixel data to the DACs 109 of the LDD 108, such that no pixel data is provided at the beginning and/or end of each pixel period so as to cause guard band(s) at the beginning portion and/or end portion of each pixel period. More generally, the controller 104 can be configured to cause at least one timing guard band, per pixel period, by outputting the R, G and B pixel data during only a portion (e.g., 80% or 90%) of each pixel period. For another example, the controller 104 can selectively disable each of the DACs 1091, 1092 and 1093 of the LDD 108 during a beginning portion and/or end portion of each pixel period through selective application of the enable signals shown as dashed lines 1111, 1112 and 1113 in FIG. 1. Alternatively, the LDD 108 can selectively disable each of its DACs 1091, 1092 and 1093 during a beginning portion and/or end portion of each pixel period. In other words, the LDD 108 can be configured to cause at least one timing band, per pixel period, independent of any control signals received from the controller 104. For example, the LDD 108 can be configured to cause there to be a guard band at the beginning and/or end of each pixel period, so that maximum duty cycle at which the light emitting elements 112 are only driven is limited to a portion (e.g., 80% or 90% of each pixel period. More generally, the controller 104 and/or the LDD 108 can be configured to cause at least one timing guard band, per pixel period, by enabling the DACs 109 of the LDD 108 during only a portion (e.g., 80% or 90%) of each pixel period. Other variations are also possible and within the scope of an embodiment.

Figure 5:
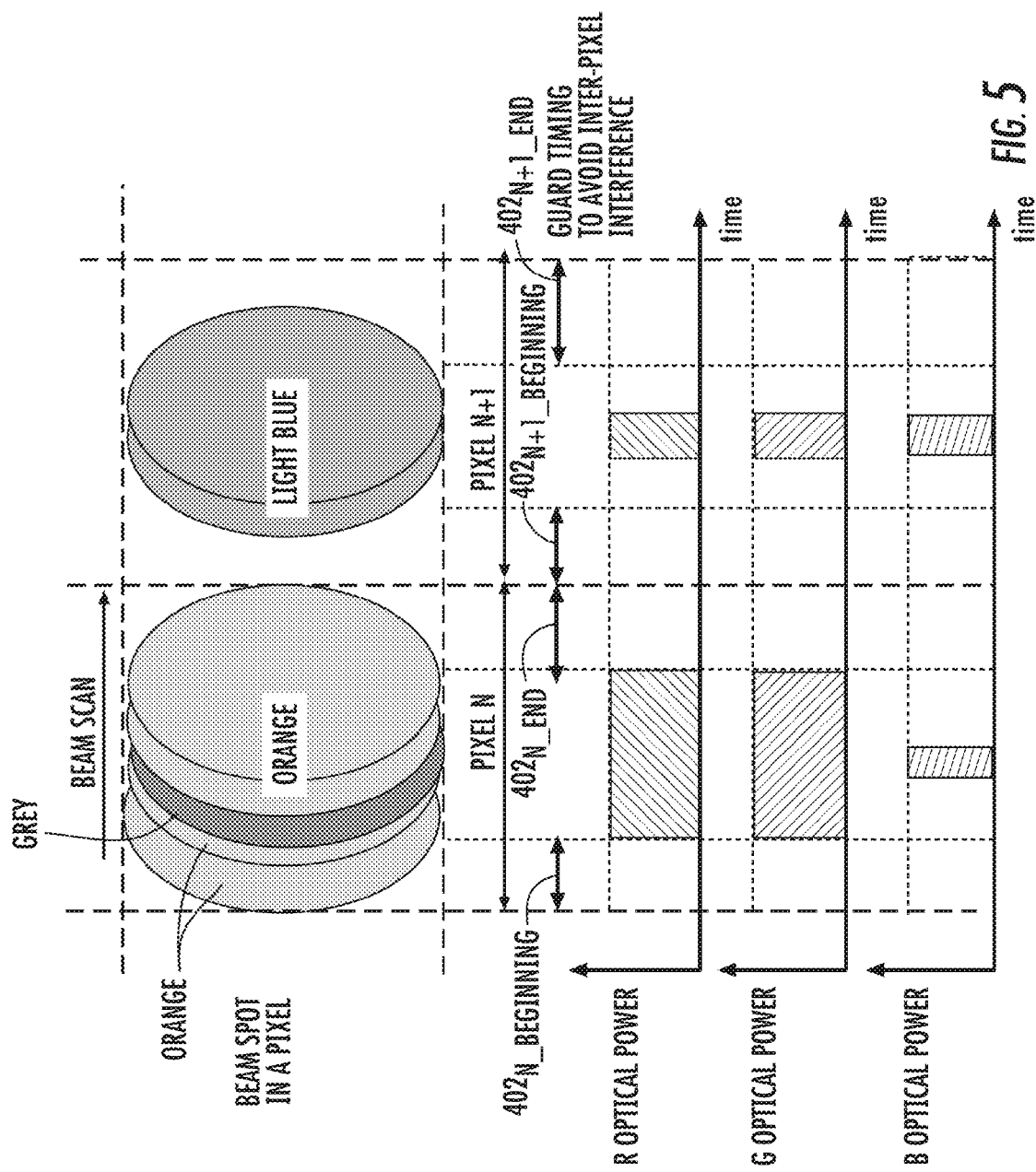
FIG. 5 illustrates that while guard bands can be used to avoid inter-pixel interference, where duty-cycle control is used to control the intensity of the light emitted by the R, G and B light emitting elements, color shift may be occur due to different R, G and B spot timing.

Guard timing bands 402 can be used where level control is used to control the intensity of the light emitted by the R, G and B light emitting elements (e.g., laser diodes, but not limited thereto), as was the case in FIG. 4 described above. Guard timing bands can also be used where duty-cycle control, or a combination of level control and duty-cycle control, is/are being used to control the intensity of light emitted by the R, G and B light emitting elements. For an example, FIG. 5 illustrates timing guard bands used with duty-cycle control. More specifically, referring to FIG. 5, the Pixel N period is shown as including a beginning guard band $402_{N\_beginning}$ and an end guard band $402_{N\_end}$. Similarly, the Pixel N+1 period is shown as including a beginning guard band $402_{N+1\_beginning}$ and an end guard band $402_{N+1\_end}$. In an alternative embodiment, only the beginning of each pixel period includes a guard timing band, but the end of each pixel period does not. In still another embodiment, only the end of each pixel period includes a guard timing band, but the beginning of each pixel period does not.

In embodiments utilizing guard bands, the width of the guard bands defines a maximum pulse width or duty-cycle possible within each pixel period. For example, in an embodiment where there is both a beginning guard band and an end guard band within each pixel period, with each guard band taking up 10% of the pixel period, then the maximum pulse width within each pixel period is 80% of the pixel period, i.e., the maximum duty cycle is 80%. For another example, in an embodiment where there is a beginning guard band (but not an end guard band) within each pixel period, with the beginning guard band taking up 10% of the pixel period, then the maximum pulse width within each pixel period is 90% of the pixel period, i.e., the maximum duty cycle is 90%. For still another example, in an embodiment where there is an end guard band (but not a beginning guard band) within each pixel period, with the end guard band taking up 20% of the pixel period, then the maximum pulse width within each pixel period is 80% of the pixel period, i.e., the maximum duty cycle is 80%.

While timing guard bands can be used to avoid inter-pixel interference, where duty-cycle control is being used, alone, or in combination with level control, a color shift may occur due to the pulse widths associated with different colored light beams being of different widths or timing. For example, in FIG. 5, in the Pixel N period, the pulse width associated with the B light beam emitted by the B light emitting element, is significantly narrower than the pulse widths associated with the R and G light beams emitted by the R and G light emitting elements. In other words, FIG. 5 illustrates how a color shift may be caused by different R, G and B spot timing. More specifically, color shift may occur because of the different in R, G, and B spot positions (lighting areas). In FIG. 5, for example, the R spot position (lighting area) is the same as the G spot position (lighting area). However, in FIG. 5, in the Pixel N period, the B spot position (lighting area) differs from that are the R and G spot positions, due to the smaller pulse width of the B pulse compared to the R and G pulses.

Figure 6:
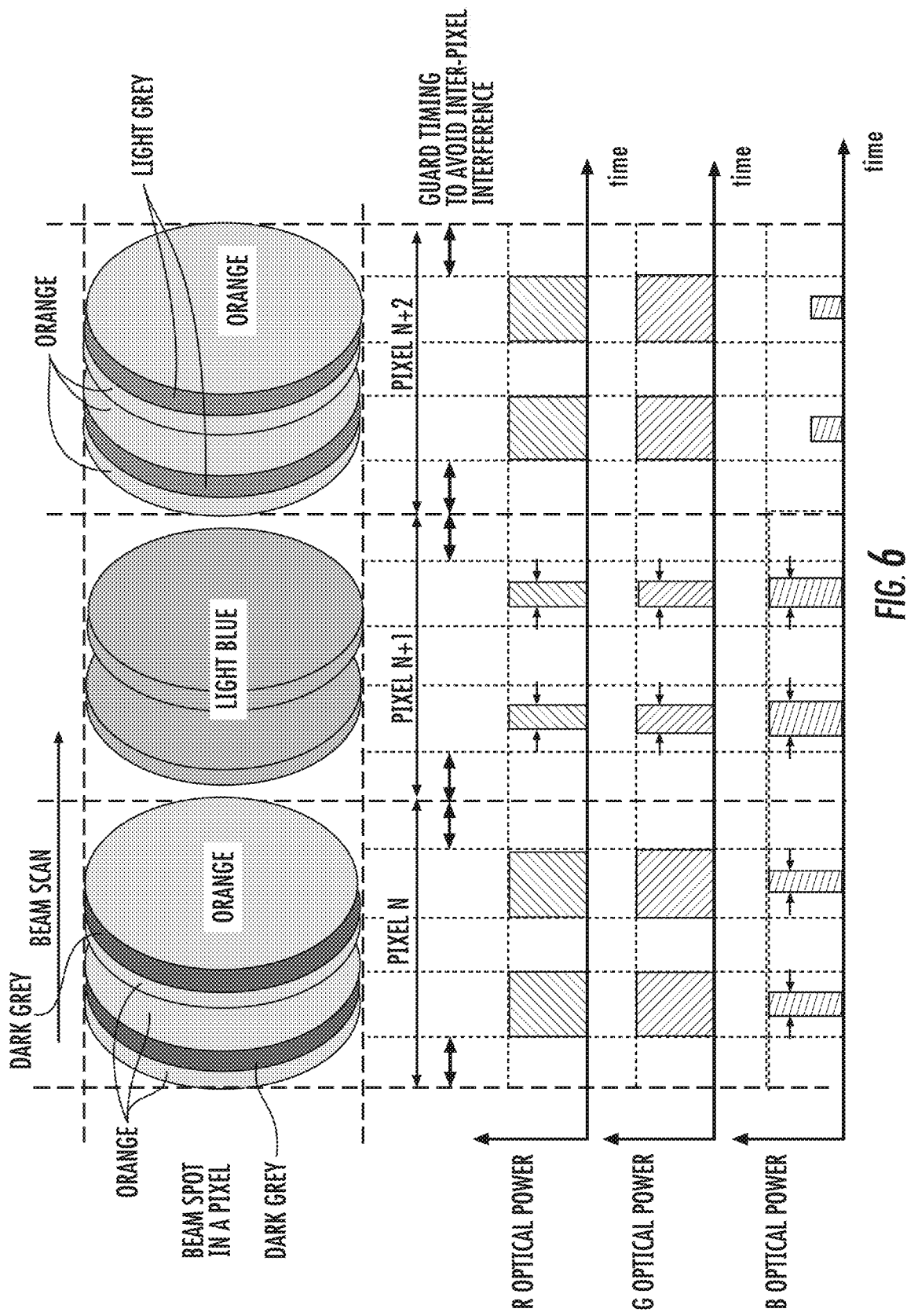
FIG. 6 illustrates that multiple pulses can be included in each pixel period to reduce color shifts that may be occur due to different R, G and B spot timing, in accordance with specific embodiments of the present invention.
Figure 7:
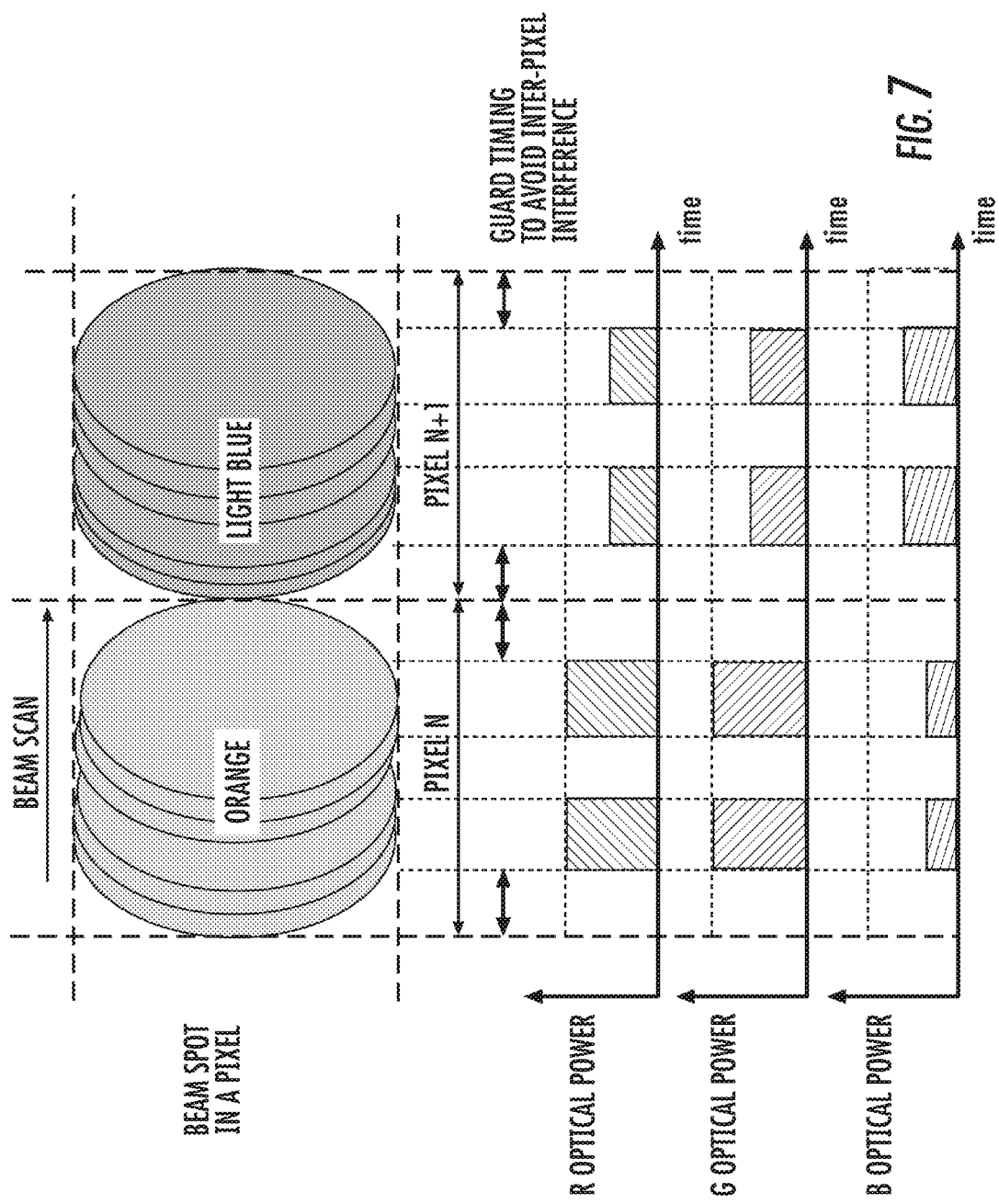
FIG. 7 illustrates that multiple pulses can be included in each pixel period to reduce color shifts when using level control (without duty-cycle control) to control the intensity of R, G and B light beams emitted by R, G and B light emitting elements, in accordance with specific embodiments of the present invention.
Figure 8:
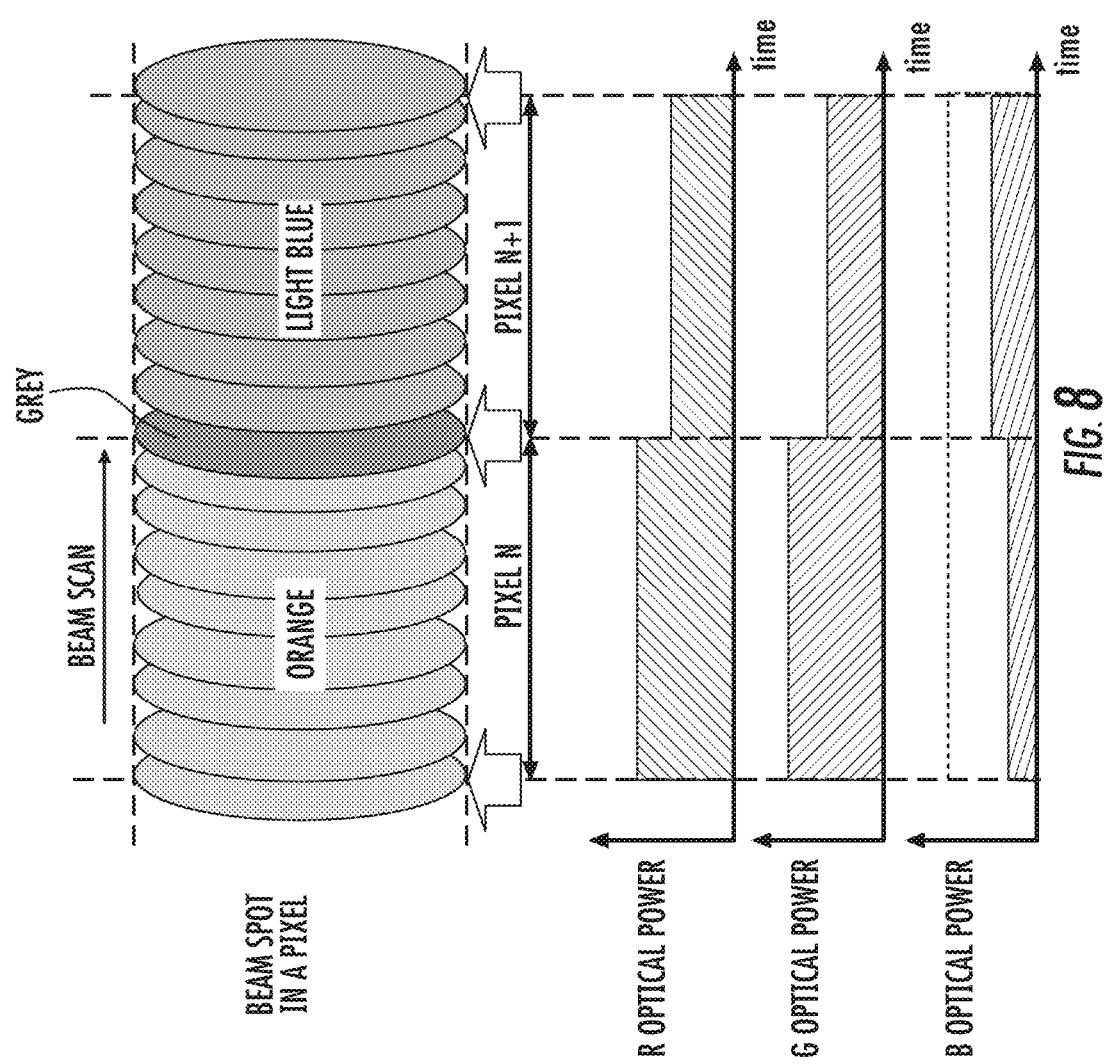
FIGS. 8, 9, 10, 11 and 12 are similar, respectively, to FIGS. 3, 4, 5, 6 and 7, except with different (i.e., narrower) beam spot profiles in FIGS. 8, 9, 10, 11 and 12.
Figure 9:
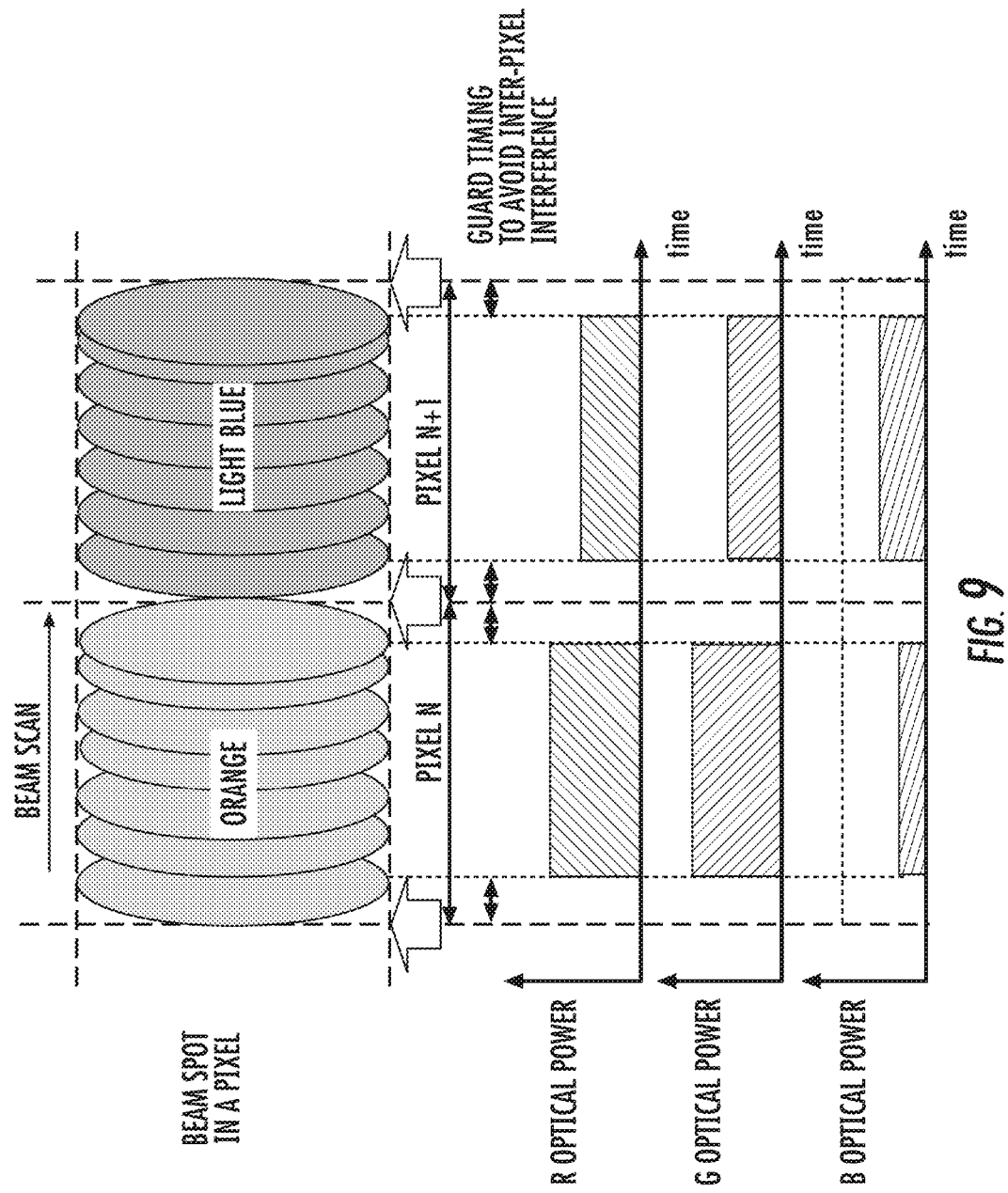
Figure 10:
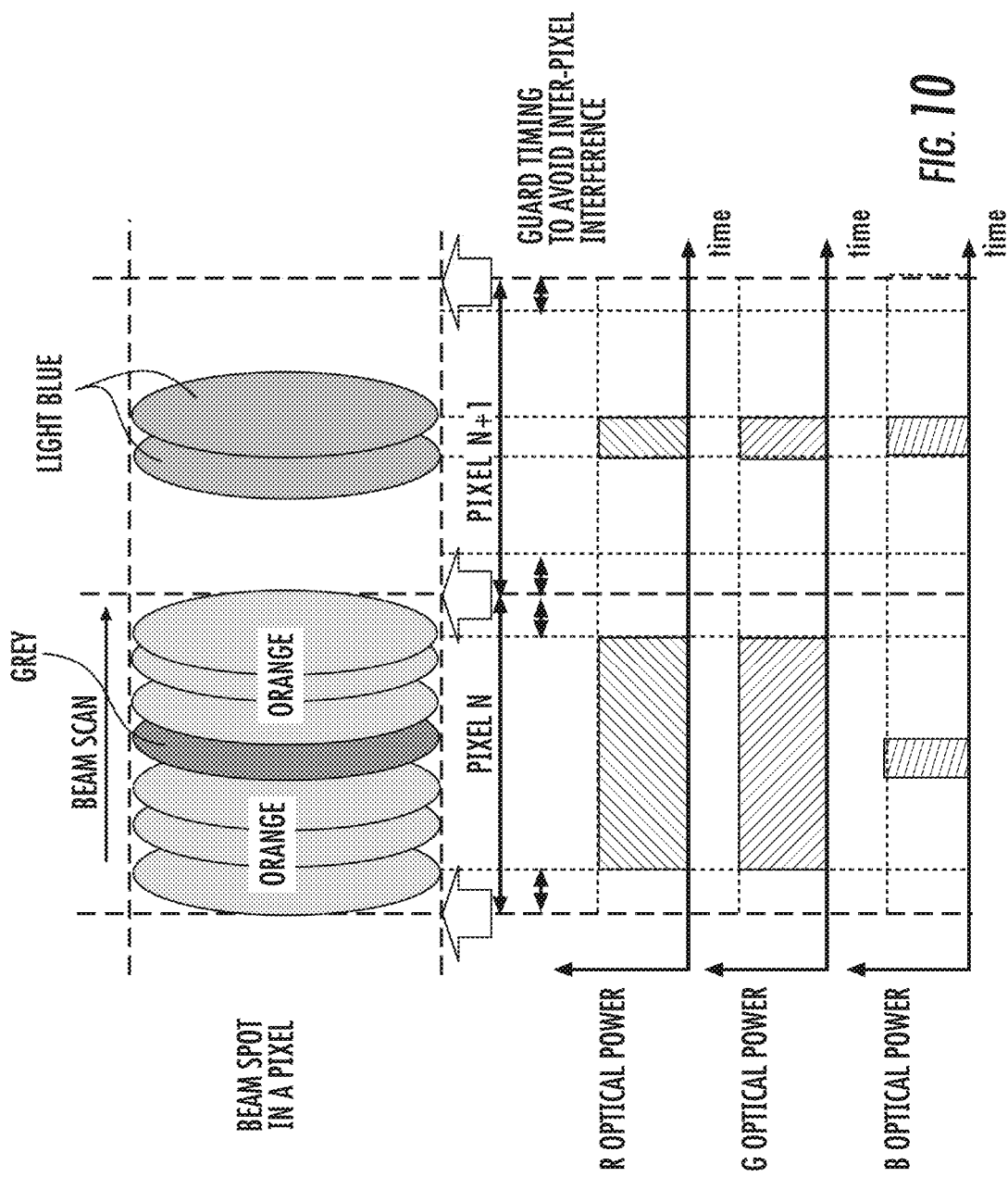

By utilizing multiple pulses per pixel period, in accordance with specific embodiments of the present invention, the spot area (lighting area) for a pixel can be widened. For example, referring to FIG. 6, but using two pulses per pixel period, the B spot position (lighting area) is widened to be more similar to the R and G spot positions (lighting areas). This has the effect of reducing noticeable color shift. In accordance with certain embodiments, for each light emitting element that is driven to emit light, multiple pulses are included in each pixel period, as opposed to using a single pulse per pixel period. For example, FIGS. 6 and 7 illustrate examples of using two pulses per pixel period. More specifically, in FIGS. 6 and 7, there are two R, G and B pulses in the Pixel N period, and two R, G and B pulses in the Pixel N+1 period. In FIG. 6, there are also two R, G and B pulses shown in the Pixel N+2 period. It is also within the scope of embodiments described herein to include more than two (e.g., three or four) pulses per pixel period, for each light emitting element that is driven to emit light. The embodiments in FIGS. 6 and 7 are also shown as including beginning and end guard timing bands to avoid inter-pixel interference. The concept of including multiple pixels per pixel period can be utilized if using duty-cycle control alone, or a combination of level control and duty-cycle control to control the intensities of R, G and B light emitting elements of a scanning projector.

The concept of using multiple pixels per pixel period can be used to reduce the extent of color shifting that occurs when using duty-cycle control (alone, or in combination with level control) to control the intensity of R, G and B light beams emitted by R, G and B light emitting elements. This can best be appreciated by comparing the optical power versus timing graphs shown in FIGS. 5 and 6. FIG. 7 illustrates the concept of using multiple pulses per pixel period when using level control (without duty-cycle control) to control the intensity of R, G and B light beams emitted by R, G and B light emitting elements.

FIGS. 8, 9, 10, 11 and 12 are similar, respectively, to FIGS. 3, 4, 5, 6 and 7, except with different (i.e., narrower) beam spot profiles in FIGS. 8, 9, 10, 11 and 12. The narrower spot beam profiles may allow guard band widths to be reduced, thus in effect, increasing the maximum pulse width (and thus duty cycle) within each pixel period. However, the use of narrow spot beam profiles may have the effect of increasing color shift when duty-cycle control is used (alone, or in combination with level control) to control light beam intensity, as can be appreciated from FIG. 10. The use of multiple pulse per pixel period can be used to reduce such color shift. If two pulses per pixel period do not sufficiently reduce color shift, more pulse per pixel period, e.g., three pulse per pixel period, or potentially more, can be used to reduce color shift.

There are various different ways to achieve multiples pulses per pixel period. In accordance with certain embodiments, the controller 104 can be configured to cause there to be multiple pulses per pixel period. For example, during each pixel period, the controller 104 can send multiple instances of pixel data (i.e., one instance of pixel data per pulse, for multiple pulses) to the LDD 108. Other ways that the controller 104 can cause multiple pulses per pixel period are also possible, and within the scope of embodiments described herein. In other embodiments, the LDD 108 can be configured to cause there to be multiple pulses per pixel period. For example, the LDD 108 can be configured to generate two (or more) pulses per pixel period based on each instance of pixel data that the LDD 108 receives from the controller 104. Such an LDD may include, for example, two or more timers associated with each DAC 109, where one timer is used for the start timing of each pulse and another timer is used for the end timing of each pulse. In still other embodiments, a combination of the controller 104 and the LDD 108 can be configured to cause there to be multiple pulses per pixel period. In certain embodiments, multiple pulses per pixel period are used regardless of the pulse widths of pulses. In other embodiments, multiple pulses per pixel period may only be used where there is a sufficient difference in the pulse widths of different pulses, used for driving the different colored light emitting elements, such that there is a sufficient probability that a color shift may occur. In other words, the controller 104 and/or the LDD 108 can dynamically determine when it is appropriate to utilize multiple pulse per pixel period, and when it is appropriate to utilize a single pulse per pixel period. For example, in one embodiment, for each instance of pixel data that the controller 104 sends to the LDD 108, one or more bits of the pixel data can specify how many pulses are to be included in a pixel period. In such an embodiment, the LDD 108 can selectively generate multiple pixels per pixel period in dependence on instructions from the controller 104. These are just a few examples of ways in which the controller 104 and/or the LDD 108 can cause there to be multiple pulses per pixel period, which examples are not meant to be all inclusive. One of ordinary skill in the art reading this description would understand that other ways of implementing multiple pulses per pixel period are possible and within the scope of embodiments of the present invention describe herein.

While the laser diodes (and more generally, light emitting elements) described herein were described as being red, green and blue in color, it is within the scope of embodiments of the present invention that the light emitting elements emit light of colors other than red, green and blue, such as, but not limited to, cyan, magenta and yellow. It is also within the scope of the present invention that more three colors are produced per pixel by the light emitting elements, e.g., red, green, blue and yellow (e.g., if four light emitting elements are used, the LDD 108 could include four DACs). As noted above, it is also possible that two green light emitting elements be used, or more generally, that two light emitting elements emit the same color.

In the above description, the light emitting elements 112 were typically described as being laser diodes, but can alternatively be other types of light emitting elements, including, e.g., light emitting diodes (LEDs), organic LEDs (OLEDs), bulk-emitting LEDs, surface-emitting LEDs, vertical-cavity surface-emitting lasers (VCSELs), superluminescent light emitting diodes (SLEDs), or pixel diodes, but are not limited thereto.

Figure 13:
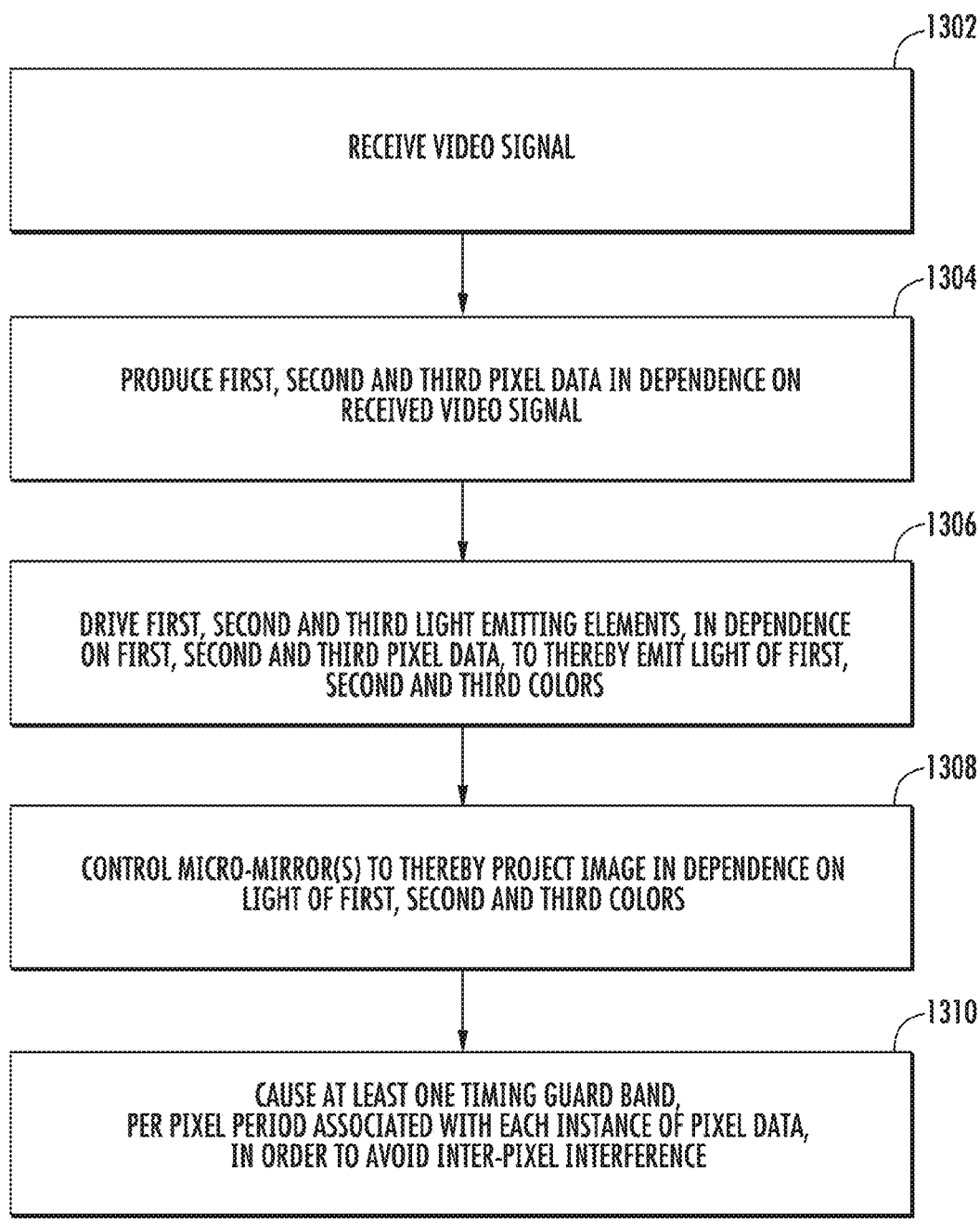
FIG. 13 is a high level flow diagram that is used to summarize methods according to certain embodiments of the present invention that use one or more timing guard bands to avoid inter-pixel interference and thereby reduce color shifts.

FIG. 13 is a high level flow diagram that is used to summarize methods according to certain embodiments of the present invention that use one or more timing guard bands to avoid inter-pixel interference and thereby reduce color shifts. Referring to FIG. 13, step 1302 involves receiving a video signal. The video signal can be received from a video source, e.g., the video source 102 shown in FIG. 1. Step 1304 involves producing first, second and third pixel data in dependence on the received video signal. The first, second and third pixel data can be, e.g., red (R), green (G) and blue (B) pixel data. Fourth pixel data, e.g., yellow (Y) pixel data or further green pixel data, may additionally be produced. The first, second and third pixel data can alternatively be cyan, magenta and yellow pixel data. Other variations are also possible.

Still referring to FIG. 13, step 1306 involves driving first, second and third light emitting elements (e.g., 112 in FIG. 1), in dependence on the first, second and third pixel data, to thereby emit light of first, second and third colors. The first, second, and third light emitting elements can be, e.g., red, green and blue laser diodes that respectively emit red, green and blue light in response to being driven. The first, second, and third light emitting elements can be alternatively be cyan, magenta and yellow light emitting diodes that respectively emit cyan, magenta and yellow light in response to being driven. Other variations are also possible. Where fourth pixel data is also received, step 1306 can also involve driving a forth light emitting element in dependence on the fourth pixel data.

Step 1308 involves controlling one or more micromirror(s) (e.g., 118) to thereby project an image in dependence on the emitted light of the first, second color and third colors.

Step 1310 involves causing at least one timing guard band, per pixel period, in order to avoid inter-pixel interference. As can be appreciated from the discussion above, step 1310 can be performed simultaneously with one or more of the other steps described with reference to FIG. 13.

In accordance with certain embodiments, step 1310 involves causing two timing guard bands, per pixel period, in order to avoid inter-pixel interference, wherein the two timing guard bands include a beginning timing guard band associated with a beginning portion of a pixel period and an end timing guard band associated with an end portion of the pixel period. Alternatively, step 1310 can involve causing only one timing guard band per pixel period, wherein the one timing guard band is either associated with a beginning portion of the pixel period or an end portion of the pixel period.

One way to accomplish step 1310 is outputting the first, second and third pixel data during only a portion of each pixel period, which is less than an entirety of each pixel period. Another way to accomplish step 1310 is to enable DACs that drive the first, second and third light emitting elements during only a portion of each pixel period, which is less than an entirety of each pixel period. Additional details of the methods summarized with reference to FIG. 13 can be appreciated from the above discussion of FIGS. 1-12.

In accordance with certain embodiments, steps 1302, 1304, 1308 and 1310 are performed by a controller (e.g., 104) of a projector display (e.g., 100), and step 1306 is performed by a driver (e.g., 108) that is being controlled by the controller. It is also possible that step 1310 is alternatively performed by a driver (e.g., 108), or a combination of a controller (e.g., 104) and a driver (e.g., 108). Other variations are possible, and within the scope an embodiment.

Figure 14:
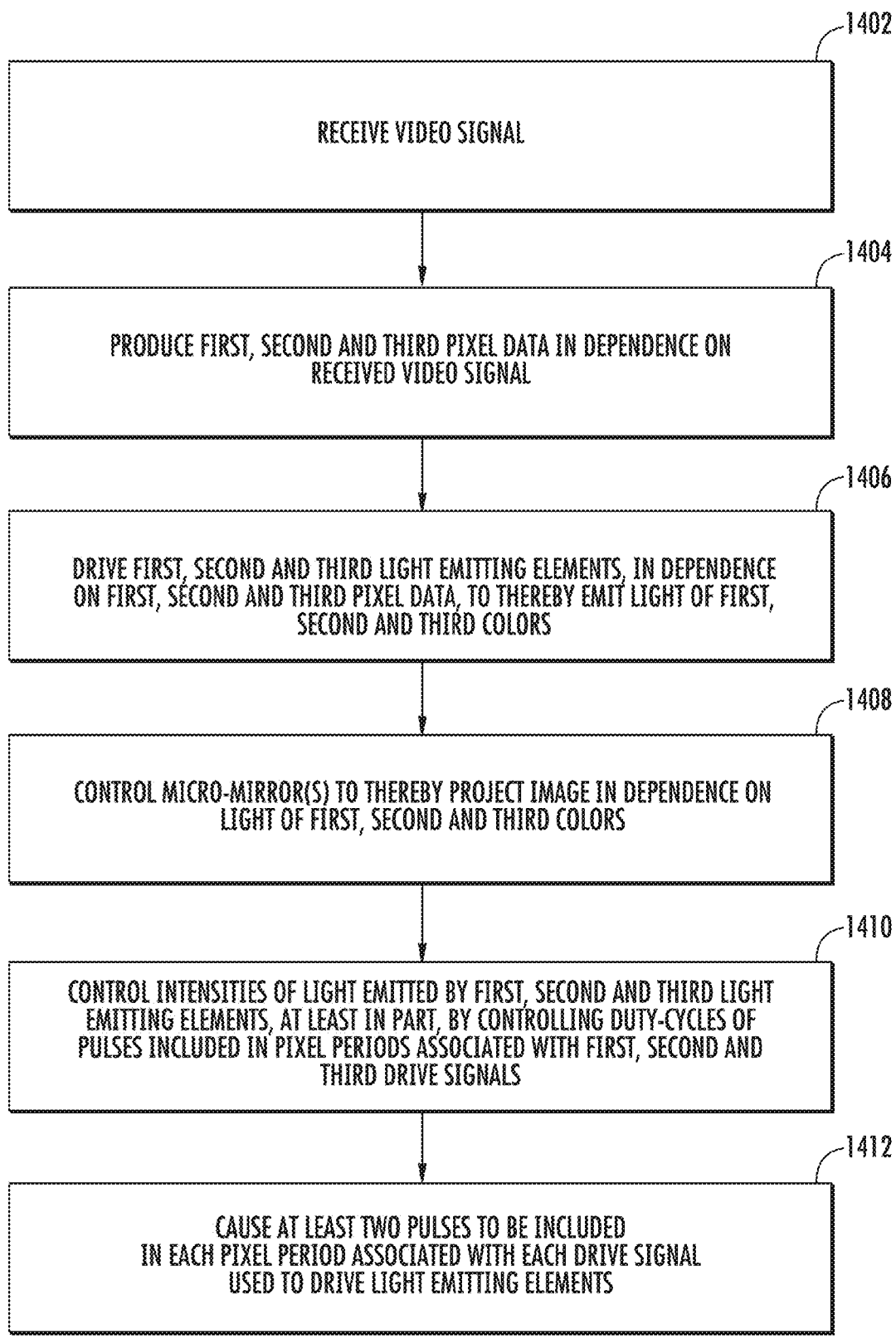
FIG. 14 is a high level flow diagram that is used to summarize methods according to further embodiments of the present invention that are used to reduce color shifts.

FIG. 14 is a high level flow diagram that is used to summarize methods according to further embodiments of the present invention that are used to reduce color shifts. Referring to FIG. 14, steps 1402, 1404, 1406 and 1408 are the same, respectively, as steps 1302, 1304, 1306 and 1308 described above with reference to FIG. 13, and thus, these steps need not be explained again. Rather, reference should be made to the discussion of those steps with respect to FIG. 13.

Still referring to FIG. 14, step 1410 involves controlling intensities of the light emitted by the first, second and third light emitting elements, at least in part, by controlling duty-cycles of pulses included in pixel periods associated with the first, second and third drive signals. As described above, e.g., with reference to FIGS. 1 and 2, such intensities can also be controlled using level control. In other words, duty-cycle control alone can be used, or a combination of duty-cycle control and level control can be used. Step 1410 can be performed simultaneously with one or more of the other steps described with reference to FIG. 14.

Still referring to FIG. 14, step 1412 involves causing at least two pulses to be included in each pixel period associated with each of the drive signals used to drive the light emitting elements to cause the light emitting elements to emit light. Step 1412 can be performed simultaneously with one or more of the other steps described with reference to FIG. 14.

In accordance with certain embodiments, steps 1402, 1404, 1408, 1410 and 1412 are performed by a controller (e.g., 104) of a scanning projector (e.g., 100), and step 1406 is performed by a driver (e.g., 108) that is being controlled by the controller. It is also possible that step 1412 is alternatively performed by a driver (e.g., 108), or a combination of a controller (e.g., 104) and a driver (e.g., 108). Other variations are possible, and within the scope an embodiment. Additional details of the methods summarized with reference to FIG. 14 can be appreciated from the above discussion of FIGS. 1-12.

Figure 11:
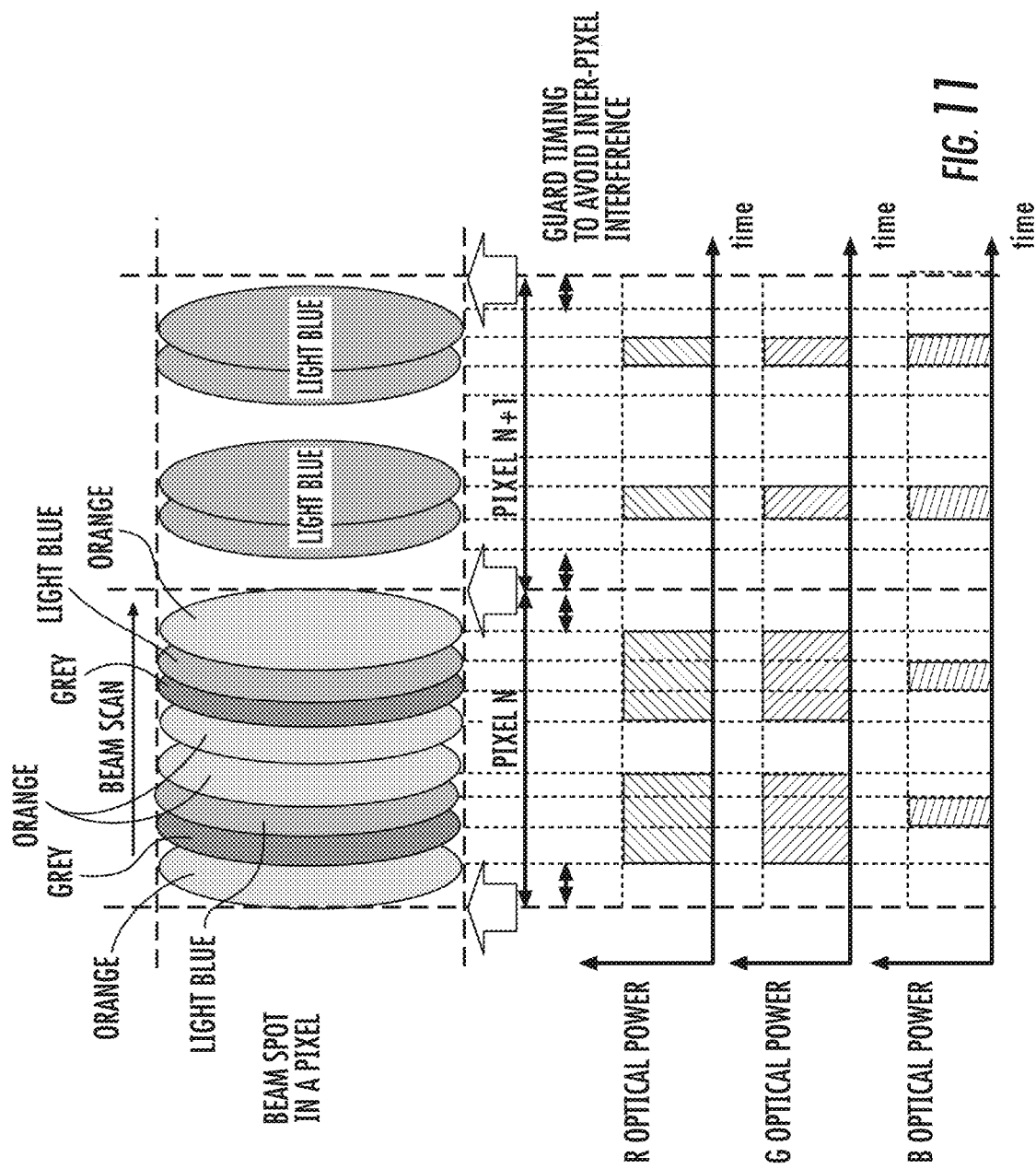
Figure 12:
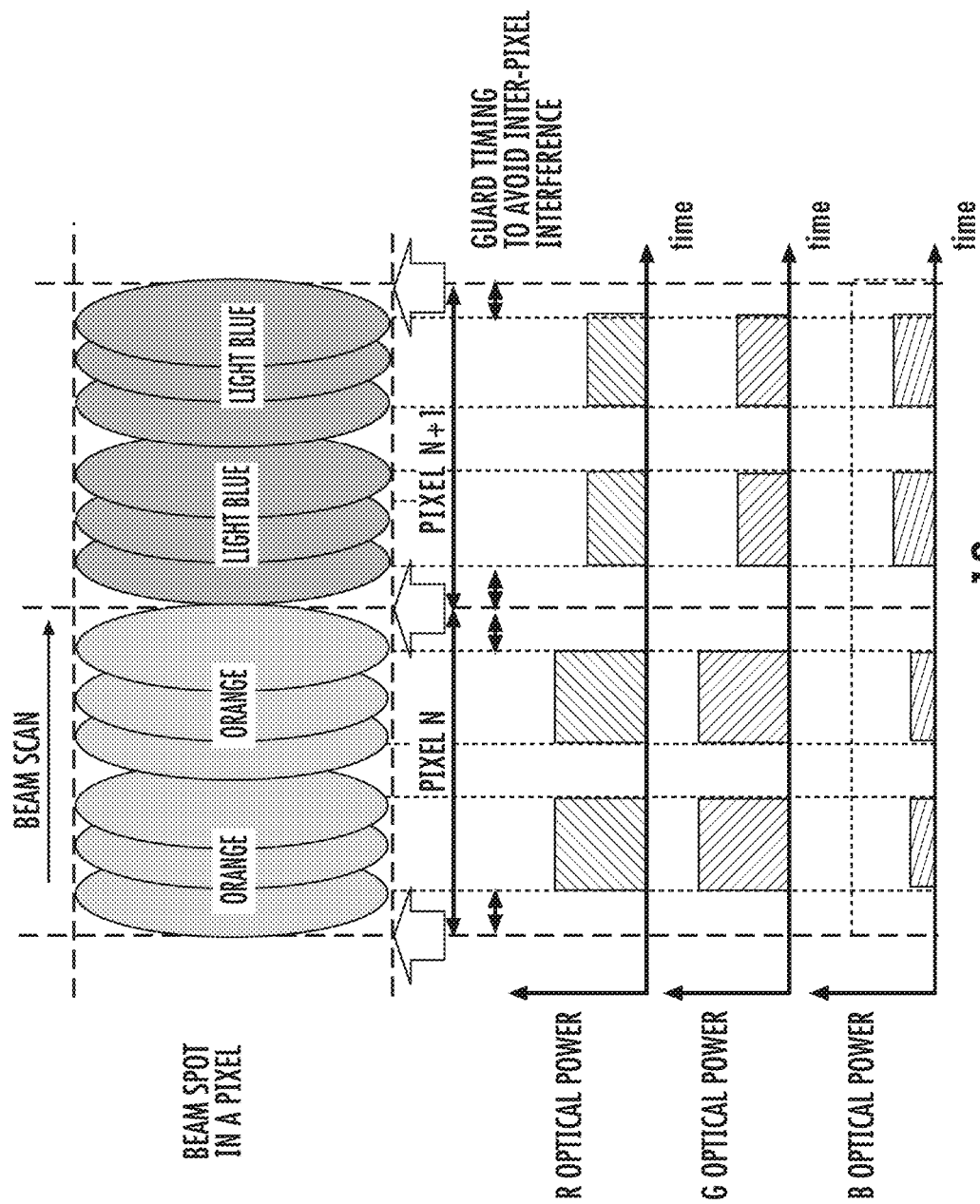

One of the methods summarized with reference to FIG. 14 can be used alone, or in combination with, one of the methods summarized with reference to FIG. 13. For example, as shown in FIGS. 6 and 11, within each pixel period there can be one or more guard bands, which is/are used to reduce color shift that can occur due inter-pixel interference, and there can also be multiple pulses that are used to reduce color shift that can occur due different pulse widths (and thus, different beam spot timing and positions) associated with different light emitting elements.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art.

Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A scanning projector system, comprising:
a first light emitting element that selectively emits light of a first color;
a second light emitting element that selectively emits light of a second color;
a third light emitting element that selectively emits light of a third color;
a controller configured to produce first, second and third pixel data in dependence on a video signal received from a video source;
a driver configured to drive the first, second and third light emitting elements in dependence on the first, second and third pixel data produced by the controller, to thereby cause the first, second and third light emitting elements to emit, respectively, light of the first, second and third colors; and
one or more micro-mirror(s) that project an image in dependence on the light of first, second and third colors emitted by the first, second and third light emitting elements;
wherein at least one of the controller or the driver is/are configured to cause at least one timing guard band, per pixel period associated with each instance of said pixel data, in order to avoid inter-pixel interference.

2. The scanning projector system of claim 1, wherein the at least one of the controller or the driver is/are configured to cause two timing guard bands, per pixel period associated with each instance of said pixel data, in order to avoid inter-pixel interference.

3. The scanning projector system of claim 2, wherein the two timing guard bands include a beginning timing guard band associated with a beginning portion of a pixel period and an end timing guard band associated with an end portion of the pixel period.

4. The scanning projector system of claim 2, wherein each timing guard band has a width that is no greater than 10% of a width of the pixel period with which the timing guard band is associated.

5. The scanning projector system of claim 1, wherein the at least one of the controller or the driver is/are configured to cause only one timing guard band, per pixel period associated with each instance of said pixel data, in order to avoid inter-pixel interference, the one timing guard band either associated with a beginning portion of the pixel period or an end portion of the pixel period.

6. The scanning projector of claim 1, wherein the at least one of the controller or the driver is/are configured to cause the at least one timing guard band, per pixel period, by outputting the first, second and third pixel data during only a portion of each said pixel period, the portion less than an entirety of each said pixel period.

7. The scanning projector of claim 1, wherein the at least one of the controller or the driver is/are configured to cause the at least one timing guard band, per pixel period, by enabling digital-to-analog converters (DACs) of the driver during only a portion of each said pixel period, the portion less than an entirety of each said pixel period.

8. The projector system of claim 1, wherein:
the first color is red;
the second color is green;
the third color is blue;
the first pixel data is red pixel data;
the second pixel data is green pixel data; and
the third pixel data is blue pixel data.

9. A method of use with scanning projector system, comprising:
receiving a video signal;
producing first, second and third pixel data in dependence on the received video signal;
driving first, second and third light emitting elements, in dependence on the first, second and third pixel data, to thereby emit light of first, second and third colors;
controlling one or more micro-mirror(s) to thereby project an image in dependence on the emitted light of the first, second and third colors; and
causing at least one timing guard band, per pixel period associated with each instance of said pixel data, in order to avoid inter-pixel interference.

10. The method of claim 9, wherein the causing at least one timing guard band comprises causing two timing guard bands, per pixel period associated with each instance of said pixel data, in order to avoid inter-pixel interference.

11. The method of claim 10, wherein the two timing guard bands include a beginning timing guard band associated with a beginning portion of a pixel period and an end timing guard band associated with an end portion of the pixel period.

12. The method of claim 9, wherein each timing guard band has a width that is no greater than 10% of a width of the pixel period with which the timing guard band is associated.

13. The method of claim 9, wherein the causing at least one timing guard band comprises using only one timing guard band, per pixel period associated with each instance of said pixel data, in order to avoid inter-pixel interference, the one timing guard band either associated with a beginning portion of the pixel period or an end portion of the pixel period.

14. The method of claim 9, wherein the causing at least one timing guard band, per pixel period, includes outputting the first, second and third pixel data during only a portion of each said pixel period, the portion less than an entirety of each said pixel period.

15. The method of claim 9, wherein the causing the at least one timing guard band, per pixel period, includes enabling digital-to-analog converters (DACs) that drive the first, second and third light emitting elements during only a portion of each said pixel period, the portion less than an entirety of each said pixel period.

16. The method of claim 9, wherein:
the first color is red;
the second color is green;
the third color is blue;
the first pixel data is red pixel data;
the second pixel data is green pixel data; and
the third pixel data is blue pixel data.

17. A controller configured to produce first, second and third pixel data in dependence on a video signal received from a video source, wherein the controller is for use with a scanning projector system that includes a first light emitting element that emits light of a first color, a second light emitting element that emits light of a second color, a third light emitting element that emits light of a third color, a driver configured to drive the first, second and third light emitting elements in dependence on the first, second and third pixel data produced by the controller, and one or more micro-mirror(s) that project an image in dependence on the light of the first, second and third colors emitted by the first, second and third light emitting elements; wherein the controller is configured to cause at least one timing guard band, per pixel period associated with each instance of said pixel data, in order to avoid inter-pixel interference.

18. The controller of claim 17, wherein the controller is configured to cause two timing guard bands, per pixel period associated with each instance of said pixel data, in order to avoid inter-pixel interference.

19. The controller of claim 18, wherein the two timing guard bands include a beginning timing guard band associated with a beginning portion of a pixel period and an end timing guard band associated with an end portion of the pixel period.

20. The controller of claim 17, wherein each timing guard band has a width that is no greater than 10% of a width of the pixel period with which the timing guard band is associated.

21. The controller of claim 17, wherein the controller is configured to cause only one timing guard band, per pixel period associated with each instance of said pixel data, in order to avoid inter-pixel interference, the one timing guard band either associated with a beginning portion of the pixel period or an end portion of the pixel period.

22. The controller of claim 17, wherein the controller is configured to cause the at least one timing guard band, per pixel period, by outputting the first, second and third pixel data during only a portion of each said pixel period, the portion less than an entirety of each said pixel period.

23. The controller of claim 17, wherein the controller is configured to cause the at least one timing guard band, per pixel period, by enabling digital-to-analog converters (DACs) of the driver during only a portion of each said pixel period, the portion less than an entirety of each said pixel period.

* * * * *